Nov. 21, 1972 C. A. LEVINE 3,703,412
PROCESS FOR GENERATING ELECTRICAL ENERGY COMPRISING
MELTING THE ANODE METAL IN THE RESERVOIR PRIOR TO
MELTING THE ANODE METAL IN THE ELECTROLYTE FIBERS
Filed Sept. 8, 1970

INVENTOR.
Charles A. Levine
BY
ATTORNEY 3,703,412
PROCESS FOR GENERATING ELECTRICAL ENERGY COMPRISING MELTING THE ANODE METAL IN THE RESERVOIR PRIOR TO MELTING THE ANODE METAL IN THE ELECTROLYTE FIBERS
Charles A. Levine, Concord, Calif., assignor to The Dow Chemical Company, Midland, Mich.
Filed Sept. 8, 1970, Ser. No. 70,145
Int. Cl. H01m 33/00
U.S. Cl. 136—6                                      2 Claims

ABSTRACT OF THE DISCLOSURE

The disclosure relates to battery cells having a liquid reducible cathode and an oxidizable metal anode contained within a reservoir and a plurlaity of hollow electrolyte fibers. An improved cell is taught wherein heating means is positioned in thermal communication with the reservoir of oxidizable metal. Supporting means for the fibers is also described, which means increased battery life. Also disclosed is a process whereby the battery is activated by melting the oxidizable metal disposed in the reservoir before the metal in the fibers is melted.

BACKGROUND OF THE INVENTION

Figure 1:
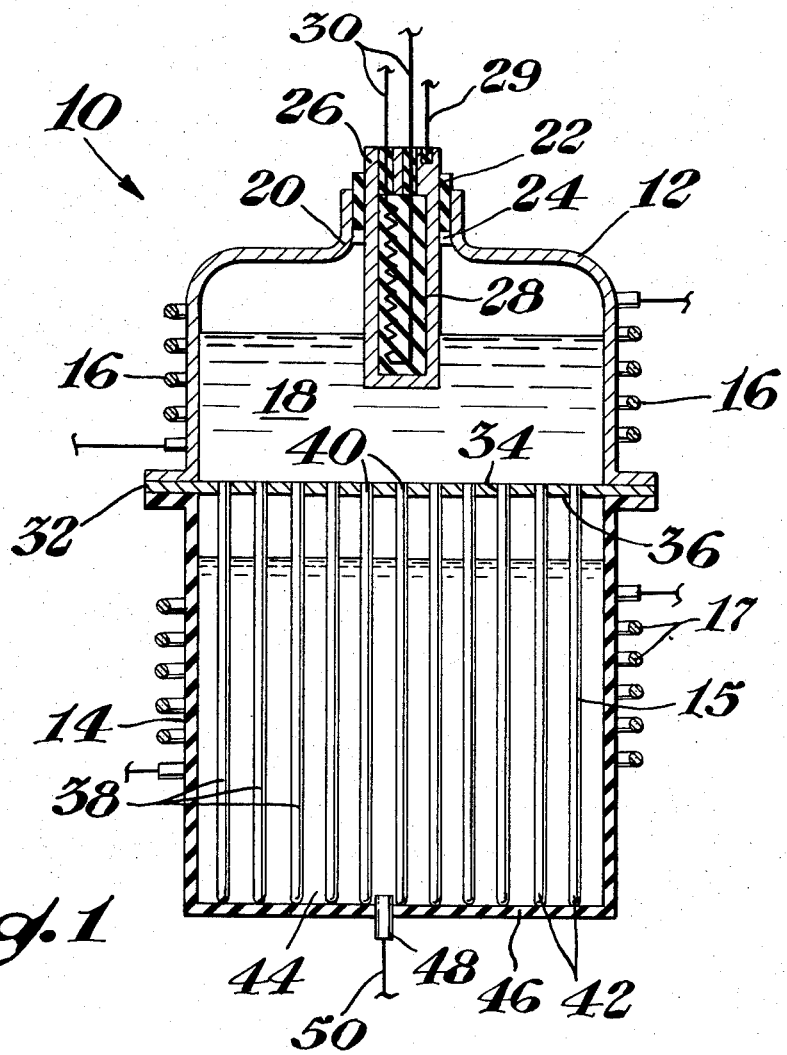

The present invention is applicable to batteries comprising a molten metal, such as sodium, as the anode. This anode is contained within a plurality of glass or ceramic ion-conducting hollow fibers or capillaries which are at least partially surrounded by a cathode. The fibers may be viewed as the electrolyte of the battery. In one embodiment, they are closed at one end for dipping into the cathode and preferably have an outside diameter of from 20 to about 2000 microns.

The electrolyte fibers described are in liquid communication with a reservoir of the metal which serves as the anode. During operation of the cell, depletion of the anode metal in the fibers occurs, thus requiring replenishment from this reservoir. Any of the alkali metals, i.e., lithium, sodium, potassium, rubidium, cesium, their amalgams, alloys and mixtures can be used as the anode. Sodium, potassium and their binary alloys ordinarily are employed.

Cathode materials are non-aqueous, ion-conducting liquid or fluid mixtures containing in solution the alkali metal ion of the metal of the anode. The liquid component of the catholyte is generally based on sulfur, selenium, tellurium and compounds or reducible anions such as tetracyanoethylene, para-thiocyanogen, ferricyanide and the like.

A typical anode-cathode-electrolyte system consists of a liquid sodium anode, a liquid sulfur-sodium sulfide mixture as cathode system, e.g., a sodium polysulfide, and a sodium ion conductive glass or ceramic electrolyte.

During operation of the cell, the electrodes and anode metal in the reservoir are maintained in a molten liquid state. The battery is generally cooled following use. With cooling, the molten components solidify. To start the battery again, it is necessary to reheat and melt the electrodes. During cooling, the fibers or capillaries may rupture or crack due to the stresses placed on the fibers by contraction of the cathode as it cools. During heating, other stresses are created by expansion of the oxidizable metal anode within the fibers.

These thermal stresses are not overcome and may even be accentuated by battery cells wherein the major heating means is positioned proximately and in thermal communication with the cathode and electrolyte fibers. For example, thermal stresses are relatively high where resistance heating elements are housed in the portion of the battery casing containing the cathode with little or no heating elements communicating with the reservoir of anode metal. Such batteries are not adapted to heat and melt the reservoir of anode metal before the metal in the fibers is melted, and would therefore fall outside the scope of the present invention.

DESCRIPTION OF THE INVENTION

It has been discovered that in batteries of the type described above, rupturing problems in the fibers are diminished if a heating means is proximately to and positioned in thermal communication with the reservoir of oxidizable anode metal. Preferably, the heating means is disposed adjacent to or within the casing enclosing the reservoir of anode metal. The heating means can also be positioned within the anode lead which communicates with the reservoir of anode metal. Frequently, heating means are positioned in both the reservoir casing and the anode lead.

As used above, the term "heating means" includes electrical heaters such as resistance heaters. The heaters can be adapted to provide either fixed or variable output. Preferably, the shape of the heating means and positioning thereof are adapted to accomplish generally uniform heating of the reservoir of anode metal.

To further understanding of the invention, the embodiment thereof depicted in the drawing will now be described. With reference to the drawing, there is depicted a battery cell 10 comprising a reservoir casing 12 positioned above a cathode casing 14. Positioned adjacent to the casing are a plurality of heating elements 16 of the resistance or inductance type. Generally these heating elements are variable resistance heaters and can be operated at different rates. The casing heating elements 16 are positioned adjacently to a reservoir of oxidizable anode metal 18 contained within the reservoir casing 12. The exact configuration of the heating elements can vary, e.g., they can be disposed in a horizontal-helical array or the elements can be disposed about the casing 12 in a vertical, substantially-parallel, spaced-apart array.

The upper extremities of the reservoir casing converge to form a neck 20. Positioned within the neck and in sealing engagement therewith is an insulating collar 22. Also positioned within the neck is a sealing collar 24. The lower transverse surface of the insulating collar nests against the upper transverse surface of the sealing collar. The sealing collar 24 is also in sealing engagement with the neck portion 20 of the reservoir casing 12.

The collars 22 and 24 circumferentially engage an anode lead 26. The anode lead 26 is in sealing relationship with the collars. The lower portion of the anode lead 26 is submerged in the reservoir 18 of oxidizable anode metal. Positioned within the anode 26 is a heating element 28 (e.g., a resistance heater). The anode heating element 28 is in thermal communication with the reservoir of anode metal 18. Heating element leads 30 are attached to the heating element 28 and communicate with a power source (not shown). The heating elements 16 and 28 do not have to directly contact the cathode casing 14 and can thereby be in insulating relationship with the cathode 44 and fibers 42 contained therein. Both of the heating elements 16 and 28 are insulated electrically from other portions of the battery cell such as the reservoir of anode metal.

Positioned below the reservoir casing is a horizontally-disposed header 32 having a top surface 34 and a bottom surface 36. The top surface 34 is in sealing engagement with the bottom edge of the reservoir casing 12. The bottom surface 36 of the header is in sealing engagement with the cathode casing 14. A plurality of hollow electrolyte fibers 38 extend through the header 32 in a generally vertical manner. Each of the fibers 38 has an open upper end 40 and a closed lower end.

The open upper ends 40 of the fibers communicate with the reservoir of anode metal 18. The cathode casing 14 defines a cathode chamber 15. Contained within the cathode chamber 15 is the reducible cathode 44. The reducible cathode 44 surrounds the fibers 38 and is in thermal communication therewith.

A plurality of heating elements 17 are positioned proximately to the cathode casing 14. The heating elements provide heat to the reducible cathode 44 and fibers 38. Frequently, the heating elements are disposed circumferentially in the form of a helix about the cathode casing 14.

Positioned below the closed lower ends 42 of the fibers 38 is the base portion 46 of the cathode container 14. The base 46 is fitted with a cathode lead 48 which is in electrical communication with the cathode. The cathode lead 48 communicates with an external circuit (not shown) through lead 50. The anode lead 26 communicates with an external circuit through lead 29. Generally, base member 46 is in supporting relationship with the fibers 38. Preferably, the supporting relationship is achieved by positioning the fibers 38 so that the closed-end portions thereof 42 rest upon the base member 46 or upon a support member 52 and is shown in FIG. 2.

Figure 2:
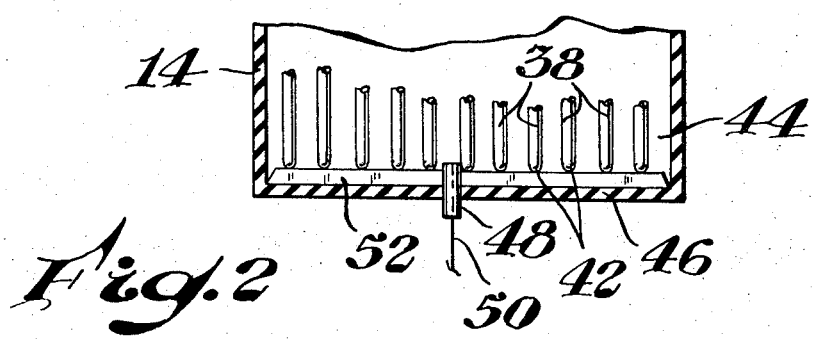

With reference to FIG. 2, the bottom member 46 of the cathode casing 14 is fitted with a support member 52. Support member 52 contacts the closed ends 42 of fibers 38 and is thereby in supporting relationship with the fibers.

In battery cells to which the invention applies, the reservoir casing generally consists of glass or ceramic materials which are resistant to the heat and chemicals present during operation of the battery. The cathode casing is composed of materials such as are described in U.S. Pat. 3,476,602 to Brown et al. The base member of the cathode casing usually consists of the same material as the cathode casing. The header is composed of a material which is ionically and electrically non-conductive and is not detrimentally affected under the operating conditions of the battery.

In operating the improved battery cells of the invention, either or both of heating means 16 and 28 are activated to begin heating and melting the anode metal 18 of the reservoir. Heat is conducted through the reservoir metal to the anode metal disposed in the fibers 38. The reservoir metal 18 being first to receive heat also melts first followed by melting of the metal in the fibers 38. The molten reservoir metal and metal in the fibers transmits heat through the header and fibers to the cathode 44 which becomes molten. As heat transmission through the header and fibers is relatively slow, melting of the cathode will follow melting of the anode metal in the reservoir and fibers. Once the cathode is molten, the battery cell is operational and current can be drawn therefrom if desired.

To accelerate activation of the battery to operational form, it is generally desirable to activate heating elements 17 after heating means 16 and 28 have been turned on. The rate of heating from elements 17 should be controlled so that the heat from the elements which is transmitted through the reducible cathode through to the fibers is not sufficient to cause melting of the metal therein until after the metal in the reservoir has become molten.

By the heating process described above, the reservoir metal becomes molten before the metal disposed in the fibers and is thereby able to accommodate expansion of the metal in the fibers caused by melting. Expansion of the metal in the fibers against a liquid head alleviates expansion pressures incurred by the fibers.

Upon cooling of the battery cell, the anode and cathode gradually solidify. As cooling and solidification proceed, it is believed that the cathode portion of the battery exerts stresses on the fibers. It has been found that detrimental effects of these stresses are greatly reduced if the fibers are supported on their lower ends as is shown in FIGS. 1 and 2.

With the improved batteries of the present invention, the heating and cooling cycles described above can be repeated many times without significant damage to the fibers.

In cooling the battery, a preferred method is to first reduce the supply of power to heating means 16 and heating elements 17. The supply of current to the anode heating means 28 is maintained to keep the anode metal of the reservoir in a molten condition until the metal in the fibers cools below the solidification temperature. The anode heating means 28 is then shut down and the reservoir metal solidifies.

The following examples are set forth to illustrate various embodiments of the present invention.

(1) A battery is constructed corresponding generally to FIG. 1. A 500 ohm electrical resistance heating element is embedded in the anode lead. The anode metal is sodium and the cathode is a mixture of sodium sulfide and sulfur, i.e., a sodium polysulfide. The average outside diameter of the fibers is about 100 microns with the walls having an average thickness of about 20 microns. The fibers contain solid sodium, and the reservoir is about ⅔ filled with solid sodium metal. The anode lead containing the embedded heating is immersed for about ⅓ of its length in the solid metal of the reservoir. For support, the fibers rest on the bottom of the battery container, which is made of aluminum.

About 0.2 ampere of current is applied to the heating element, and the sodium in the reservoir is heated to about 100° C., and begins to melt. After the sodium in the reservoir is melted, heat is applied to the external walls of the cathode casing to melt the sodium polysulfide. After the polysulfide is melted, the battery is ready for use. The battery delivers 2 watts of power. The supply of heat to the battery is reduced and the sodium polysulfide is allowed to solidify. Current is maintained through the anode heater to keep the sodium in the reservoir molten until the sodium in the fibers cools below the solidification temperature. The anode heater is then shut down and the sodium in the reservoir solidifies. This heating and cooling cycling is repeated several times. After this treatment, the battery characteristics such as internal resistance and output voltage maintain their original values. If appreciable fiber rupturing had occurred, the battery characteristics would have changed. Additionally, upon visual inspection, the fibers appear unharmed.

(2) As a comparison, a battery was constructed as in Example 1. The fibers rested on the bottom of the cell container for support. However, in activating the battery, heat was applied to melt the sodium polysulfide without melting the metal in the anode reservoir until after the metal in the fibers was melted. When the temperature was above 260° C., and the polysulfide and the sodium metal were molten, useful power could not be obtained from the battery. Examination showed that the hollow fibers containing the sodium had split and emptied the sodium metal into the polysulfide cathode.

(3) Another battery is constructed with an anode heater similar to Example 1, but the fibers are not supported by resting on the bottom of the battery container.

They are suspended freely from the header separating the sodium reservoir from the cathode chamber. This battery is heated as in Example 1. When all the sodium metal and the polysulfide are molten (above about 260° C.), the battery delivers its rated design power. This battery is then allowed to cool sequentially as in Example 1. Upon reheating, it is found that power output of the battery is reduced. Visual examination shows that the fibers have been damaged by stresses induced during the cooling of the cathode.

What is claimed is:

1. A process for generating electrical energy in a battery characterized in its dormant state as having a reservoir of solid alkali metal in communication with the interior of hollow electrolyte fibers containing solid alkali metal, said process comprising melting the alkali metal in the reservoir and thereafter melting the alkali metal in the fibers.

2. A process as in claim 1 wherein the alkali metal of the anode is sodium.

References Cited
UNITED STATES PATENTS

| | | | |
|---|---|---|---|
| 3,476,602 | 11/1969 | Brown et al. | 136—6 |
| 3,404,035 | 10/1968 | Kummer et al. | 136—6 |
| 3,413,150 | 11/1968 | Kummer et al. | 136—6 |

ANTHONY SKAPARS, Primary Examiner

U.S. Cl. X.R.

136—83 R